April 4, 1944.  L. H. MORIN  2,345,880
CONTOUR SEPARABLE FASTENER
Filed Oct. 1, 1942  2 Sheets-Sheet 1
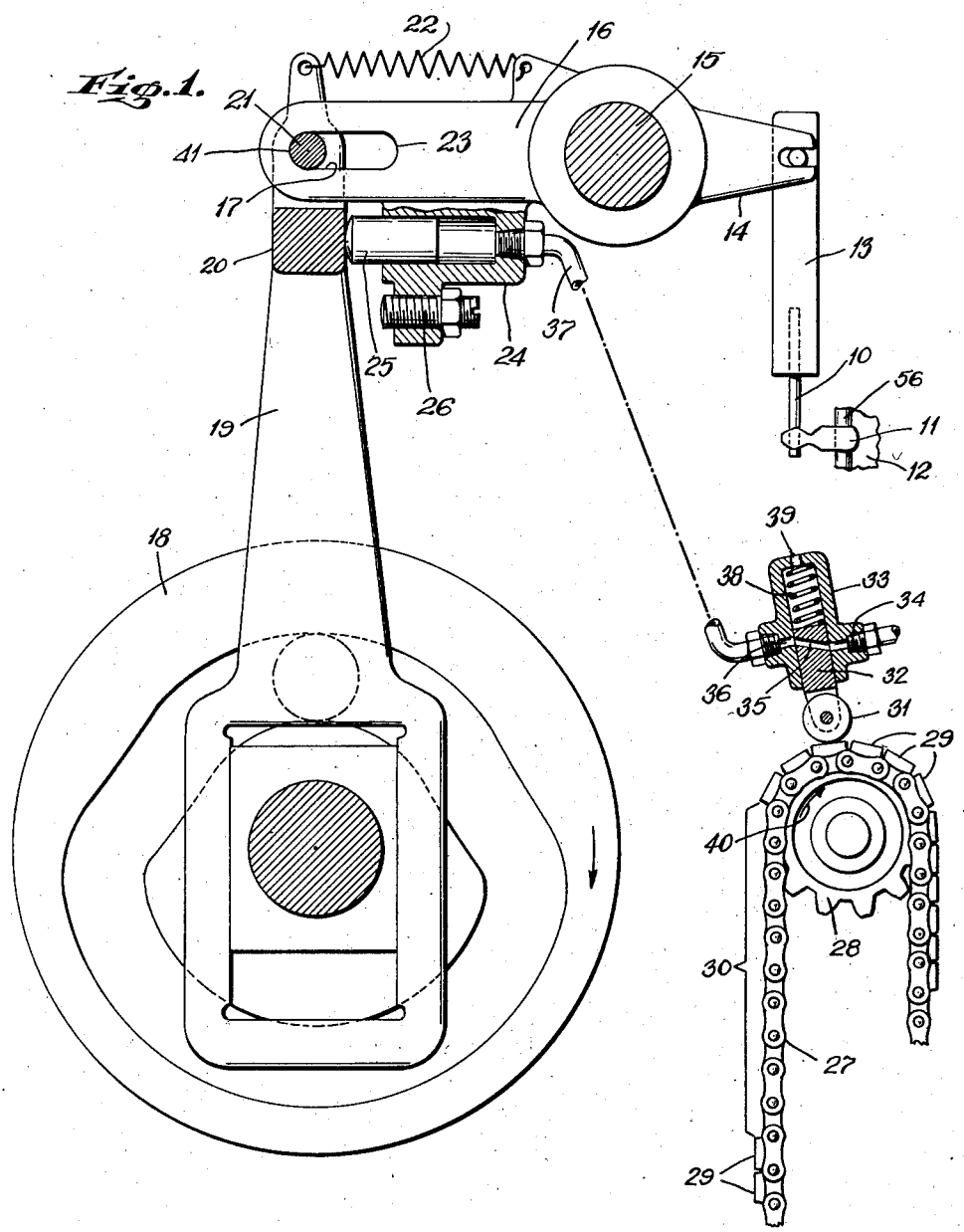
INVENTOR
Louis H. Morin
BY
ATTORNEYS April 4, 1944. L. H. MORIN 2,345,880
CONTOUR SEPARABLE FASTENER
Filed Oct. 1, 1942 2 Sheets-Sheet 2
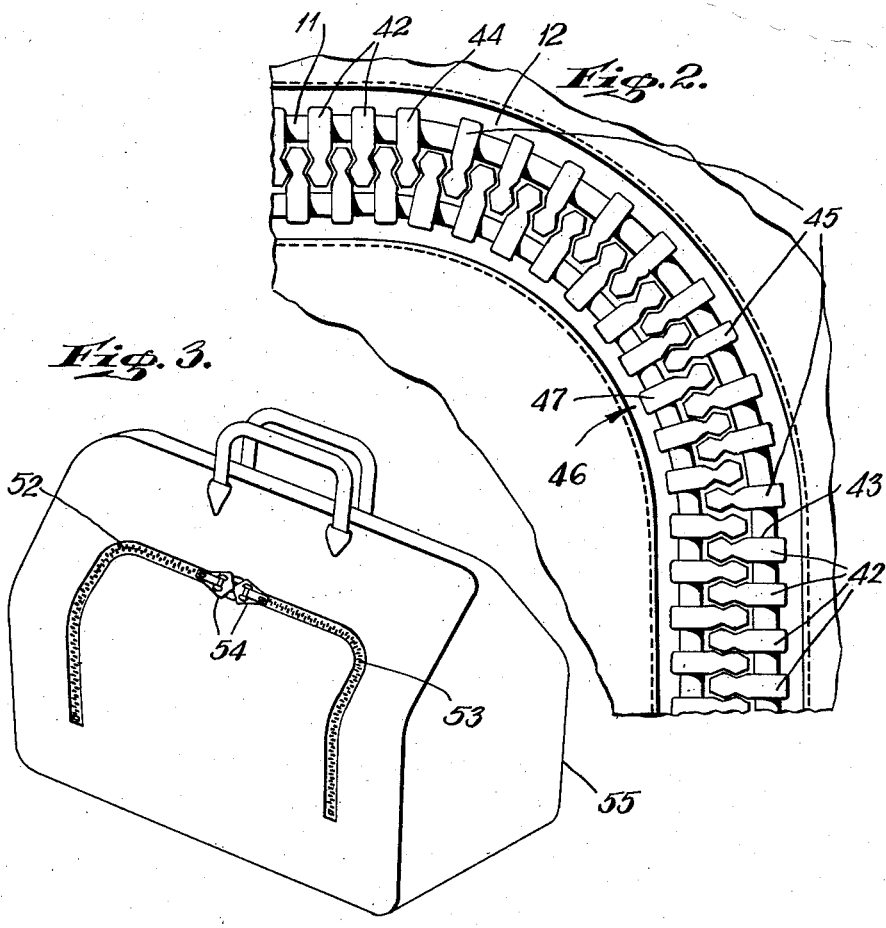
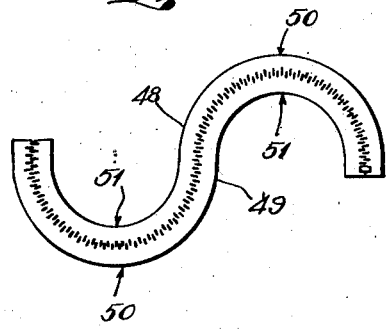
INVENTOR
LOUIS H. MORIN
BY
ATTORNEYS Patented Apr. 4, 1944

2,345,880

UNITED STATES PATENT OFFICE 2,345,880

CONTOUR SEPARABLE FASTENER

Louis H. Morin, Bronx, N. Y., assignor of one-half to Davis Marinsky, Bronx, N. Y.

Application October 1, 1942, Serial No. 460,364

4 Claims. (Cl. 24—205)

This invention relates to what I term "contour separable fasteners," that is to say, where the stringers or parts thereof are curved in the plane of the tapes to adapt fasteners for specific uses. More particularly, the invention comprises a fastener of the kind defined, wherein at least one of the stringers has a varied spacing of links thereon to produce the desired bend or curvature in a predetermined portion or section of the resulting fastener. Further, the invention comprises a method of mounting scoops on stringers in such manner as to produce fasteners of the kind under consideration.

The novel features of the invention will be best understood from the following description when taken together with the accompanying drawings, in which certain mechanisms capable of performing the method are disclosed, and in which the separate parts are designated by suitable reference characters in each of the views, and in which:

Fig. 1 is a diagrammatic view illustrating a machine which may be used in connection with the method of producing stringers according to the present invention.

Fig. 2 is a diagrammatic view illustrating the arrangement of links in forming a bend or curve in a resulting fastener.

Fig. 3 is a perspective view diagrammatically illustrating one use of the invention, and Fig. 4 diagrammatically illustrates an ogee or similar formation in a fastener.

In the construction of fasteners of the kind under consideration, it has been common to provide flexure between adjacent links sufficient to operate a fastener around relatively sharp corners, that is to say, by folding or flexing the tape of the stringers transversely. There are other uses of fasteners where it is desirable to bend or fold the stringers in the plane of the tapes and conventional fasteners of the kind under consideration are not adaptable for such uses.

To satisfy these special uses, I have conceived a method of producing stringers which comprises the formation of a varied spacing of links or scoops in at least one of the stringers, where the bend or curvature is desired therein and to incorporate as many of such spacings as may be desired to produce the necessary bends or curvatures in the complete stringer length. In addition to the particular use of the invention, which is herein shown to illustrate one adaptation of the invention, there are many instances where varied bends or curvatures are required, particularly in using separable fasteners on coverings for large machinery, apparatus, vehicles, boats and the like or in controlling pockets or flaps of such coverings where access is required to certain parts of the equipment or apparatus or to compartments in the covering or article itself.

It will, of course, be apparent that my invention is not limited to any particular method of producing separable fasteners as the method consists primarily in varying the spacing of scoops on a mounting tape or strand, regardless of what type and kind of fastener stringers are provided. Furthermore, it will be apparent that the extent of the curvatures in the stringers may be varied to extend the stringer ends to any desired degree of from the normal straight line, which would mean any degree from the straight line to lines which parallel each other and in some instances, the stringer ends may actually converge.

On carrying out my novel method an automatic die casting machine of the general type and kind covered by Patent Number 2,244,425, June 3, 1941, may be employed. It will be obvious, however, that at least part of the steps of my method may be performed by hand.

In Fig. 1 of the drawings, 10 represents a core on which a link or scoop 11 is cast in relatively movable dies, which envelope the core and also part of the mounting tape 12, on which the scoop is formed. The core 10 is supported in a holder 13 and is actuated by a lever 14, pivoted as seen at 15.

The lever has a long arm 16, provided at its outer end with an elongated slot 17.

At 18 is diagrammatically illustrated the core actuating cam, in connection with which a cam follower 19 operates and this follower has at its free, forked end 20 a pin 21, which operates in the slot 17. A spring 22 is also employed between the end 20 of the follower and the lever 14 to move the pin 20 in the direction of the end 23 of the slot 17.

Supported below the arm 16 is an air cylinder 24, in which is arranged a piston or plunger 25. Also supported in connection with the cylinder is a stop screw 26 which is employed to vary the movement of the pin 21 in the direction of the end 23 of the slot 17. In the construction shown, the screw or stop is illustrated as having a fixed adjustment, but this stop may be varied in the cycle of operation of the machine for purposes later described.

In machines of the kind under consideration, a chain 27 is employed to automatically control stringer lengths, the length of the chain governing the number of links formed in a given stringer length, all as taught in the patent hereinbefore cited. The chain 27 operates from a sprocket 28, which is driven in synchronism with the machine as will be apparent.

For illustrative purposes, the chain 27 partially shown in Fig. 1 of the drawings, will be designed to produce a fastener, the central portion of which is illustrated in Fig. 2 of the drawings. For this the chain 27 will have link portions with raised tripping elements 29 thereon. Intermediate these portions, for example in the bracketed portion indicated at 30, the tripping projections 29 will be omitted.

Suitably supported to engage the chain 27, where it rides over the sprocket 28, is a roller 31 on the end of a plunger valve 32, which is arranged in a valve casing 33. Compressed air is supplied to the casing 33 through an intake port 34 and is adapted to pass through a port 35 in the plunger valve 32 and out through an exhaust 36, which leads to the cylinder 24 through a pipe 37. A spring 38 normally supports the valve plunger 32 with the roller 31 in constant engagement with the chain. An exhaust port for the cylinder 24 is also provided at 39 on the casing 33.

In the diagrammatic illustration of Fig. 1, the roller 31 is shown operating over the elements 29 on the chain 27, the sprocket being rotated in the direction of the arrow 40. In this position, the plunger valve 32 is in position to constantly admit air to the cylinder 24; thus supporting the piston or plunger 25 in engagement with the cam follower to support the pin 21 at the extreme end 41 of the slot 17. In this operation of the machine, the scoops 11 are cast on the stringer tape 12 in what might be regarded as the normal spacing, for example, as indicated at 42 at both ends of the outer tape 12. This normal spacing ends with the scoop 43 and again begins with the scoop 44. Between the scoops 43 and 44, the scoops of this tape are spaced wider apart and this is accomplished when the roller 31 drops from the tripping section 29 of the chain onto the section bracketed as at 30. This operation closes the passage 35 and allows the air in the cylinder 24 to be exhausted through the port 39. Thereupon, the spring 22 will move the pin 21 against the end 23 of the slot 17 or the cam follower against the screw 26, according to the spacing which may be required. The end of the slot would determine the maximum spacing; whereas the screw 26 would control any degree of spacing between the maximum and minimum.

From the foregoing, it will be apparent that between the scoops 43 and 44, all of the scoops 45 will be spaced apart a distance greater than the normal minimum spacing of these scoops. In fixing the adjustment of the stop 26, this spacement will be constant; however, by automatically varying the stop screw, the spacing may be gradually increased and then gradually decreased in the cycle between the scoops 43 and 44.

Considering Fig. 2 of the drawings, the stringer 46 having the scoops 47 thereon, will be a standard type of stringer, that is, a stringer wherein all of the scoops will have the minimum spacing on the stringer tape. In other words, in producing separable fasteners of the kind under consideration, one stringer of each fastener will be standard and the other stringer of the special type constructed in accordance with the method herein defined, except in producing such results as for example illustrated in Fig. 4 of the drawings. Here both stringers 48 and 49 will be of the same construction or similar to the stringer 12 and each stringer 48 and 49 will have a portion as at 50 with the wider or varying spacing of the scoops thereon; whereas the portions 51 can have the normal minimum spacing of scoops.

The chain 27, partially indicated in Fig. 1 of the drawings, is adapted to produce stringers of the type and kind illustrated in Fig. 3 of the drawings; that is, where the resulting fastener has two curved or rounded portions 52 and 53 therein. Separable fastener stringers of this type and kind employing double action scoops, which provide free movement of the sliders in either direction on the stringers adapt these fasteners for the use of two sliders, as indicated at 54. However, in certain uses, a single slider may be operated along a fastener of the kind illustrated. Fig. 3 shows the invention as applied to a handbag, gladstone or the like 55 in controlling a side or pocket opening in the article. However, the invention is applicable for use on many types and kinds of articles for the purposes stated and in some instances, a single curved or rounded portion would be employed; whereas in other instances, the number of the offset or curved portions may be increased.

It will, of course, be apparent that in each cycle of operation of the machine in producing a stringer of predetermined length which is controlled by the length of the chain 27, the roller 31 operates over the raised or tripping portions 29 and the non-tripping portions 30 automatically actuating the plunger valve 32 in controlling movement of the pin 21 back and forth in the slot 17. This movement controls the degree of feeding by the core pin 10. In stripping this pin from each cast link or scoop 11, in the minimum spacing, a definite stop is provided on the dies employed, against which the scoop rests in the stripping operation. However, in the wider spacing of the scoops, the dies are partially closed but brought into sufficient engagement with the mounting tape 12 to support this tape against movement and the scoops are stripped against the same stop and the flexure in the tape will compensate for the control of accurate spacing. In this last operation, the dies may be moved into close proximity to each other leaving sufficient clearance only between the dies to provide free movement of the core pin, while at the same time establishing a firm engagement with the usual beaded edge 56 of the tape 12, which is indicated in Fig. 1 of the drawings.

Whenever it is desired to vary the standard or minimum spacing of the scoops on a stringer tape, the slot 17 may be increased in its dimension to the left as shown in Fig. 1 and a screw similar to the screw 26 employed to limit movement of the pin 21 in this direction, as will be apparent. In such instances, however, the normal stop on the dies against which the scoop rests in the stripping operation, will, of course, have to be changed. By providing the means for increasing as well as decreasing normal minimum spacing between the scoops of a stringer, it is possible for me to produce any desired contour in a complete stringer length, while at the same time, providing free coupling and uncoupling engagement of the stringers.

Having fully described my invention, what I claim as new and desire to secure by Letters Patent is:

1. A contour separable fastener of the char-